May 15, 1928.  1,669,597
E. E. BURSON ET AL
ELECTRIC SEMAPHORE
Filed June 3, 1920  3 Sheets-Sheet 1
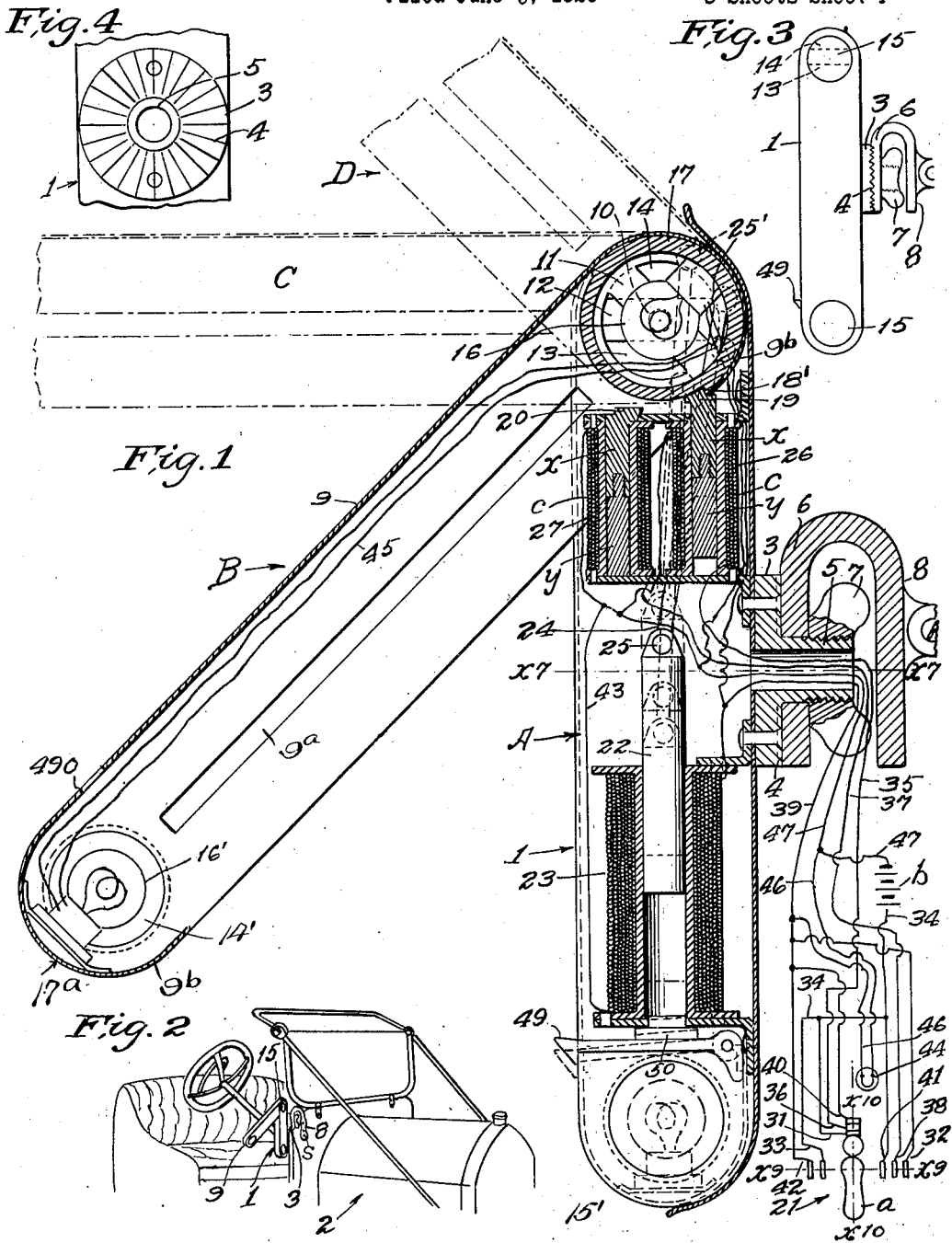
Witness
C. C. Holly.
Inventors
Ernest Emerson Burson
Louis Jacob Meller
by James R. Townsend
their Atty

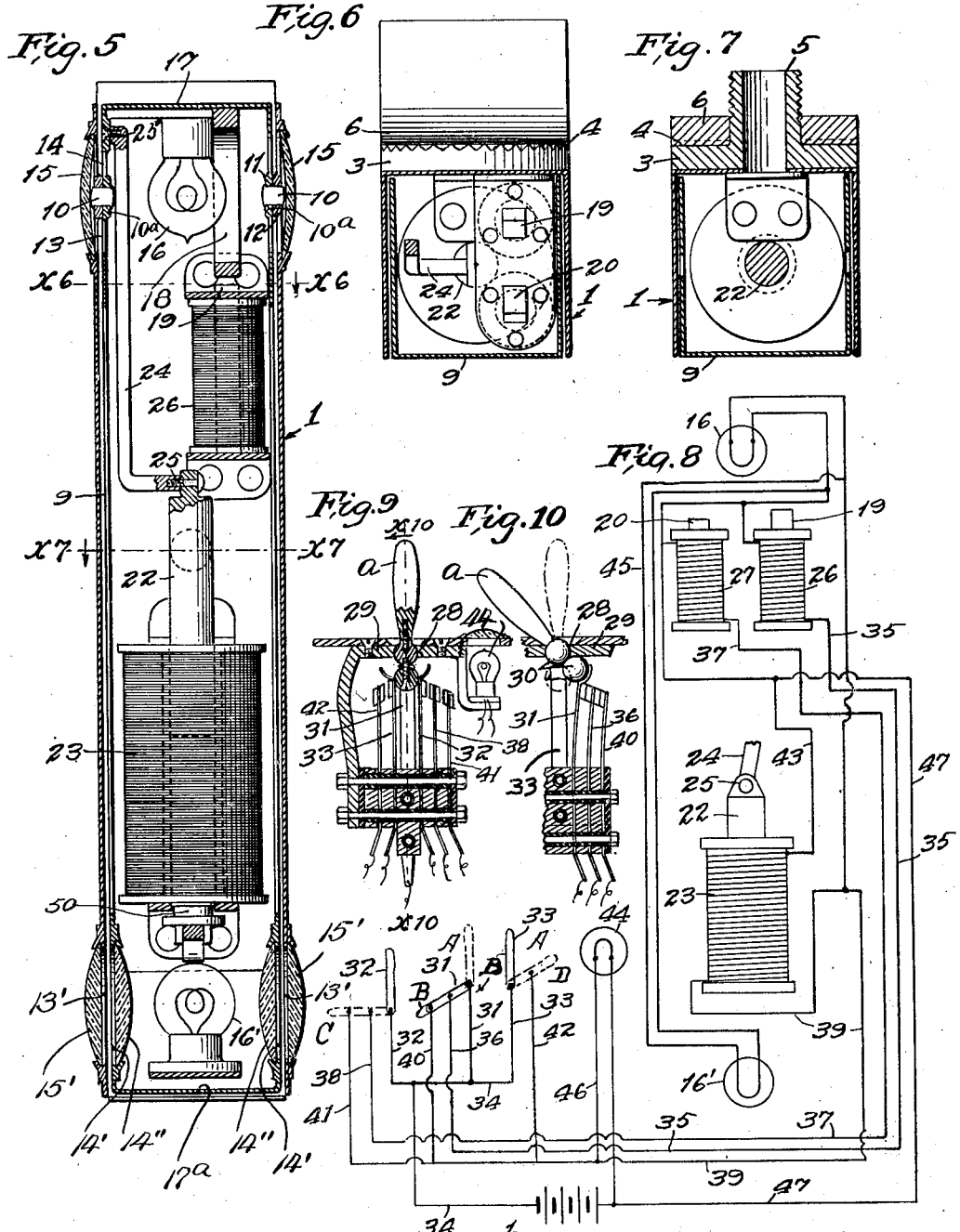

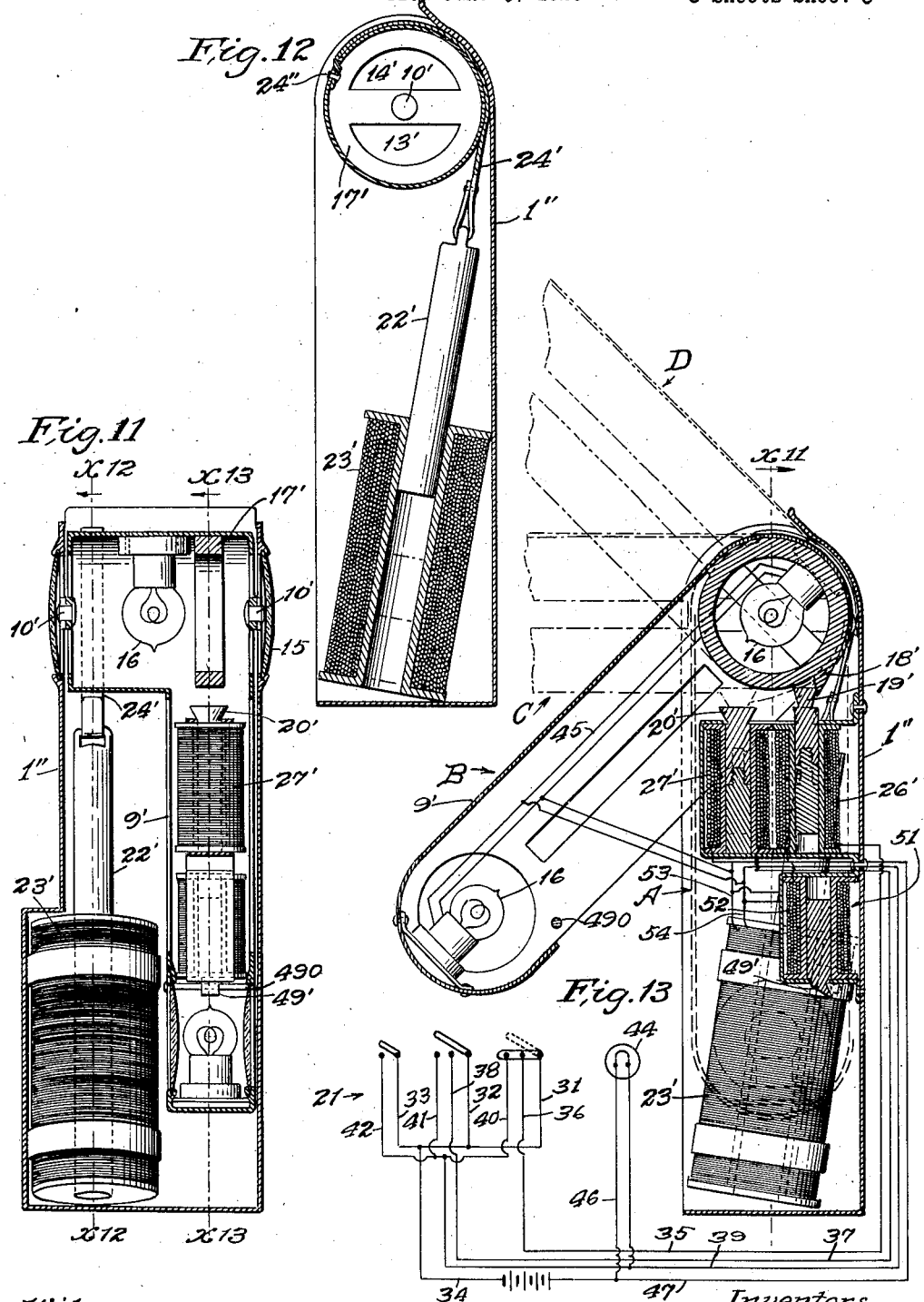

Patented May 15, 1928.

1,669,597

UNITED STATES PATENT OFFICE.

ERNEST EMERSON BURSON AND LOUIS JACOB MELLER, OF LOS ANGELES, CALIFORNIA.

ELECTRIC SEMAPHORE.

Application filed June 3, 1920. Serial No. 386,373.

The type of signaling devices to which the invention relates is that in which an arm is provided and which is adapted to be attached to conveyances, as automobiles, trucks, horse-drawn and power driven vehicles, street cars, boats and the like; said arm being adapted to be brought into various positions to indicate the intention of the driver, as to stop, turn right, turn left. Devices of this character have been provided with illuminating means to reveal the location of signaling device or to reveal the signal.

It is an object of the invention to provide an arm which can be applied to any desired or convenient part of a vehicle and moved to various positions to indicate the intention of the driver and to provide such arm on opposite sides with means whereby its location and position may be revealed at night in any signaling position it may assume and be visible from front and rear of the device.

Another object is to provide novel stop mechanism adapted to cooperate with a catch on the arm so that the arm may be stopped in various signaling positions, and which may be operated in a simple, efficient and economical manner.

We accomplish the above objects in the present form of our invention by providing a casing adapted to be attached to a vehicle and in the upper end of which is pivoted an elongated hollow arm, preferably formed of thin metallic material apertured at the opposite ends forwardly and rearwardly with respect to the vehicle, and being provided intermittently of the ends with elongated slots cut in the walls of the arm, and lying between pairs of apertures at either end of the arm. Lamps are positioned between the apertures at each end of the arm so that the direct rays therefrom will pass through said apertures when the arm is in any signaling position; diffused or reflected rays from the lamps passing through the slots.

Further objects of the invention are to provide means adapted for use with a hollow arm of the above character, which will effectively cooperate with the stop mechanism for stopping the arm in predetermined selective positions; which may be mounted on the pivoted end of the arm; which will not obstruct the rays from the light in said pivoted end; and which will not interfere with the insertion into and removal of a lamp from the pivoted end of the arm.

Another object is to provide mountings for the pivot bearing which span the apertures in the pivoted end of the arm and casing and which will not appreciably obstruct the passage of light through said apertures.

The arm and the stop mechanism of the device are preferably electrically operated, and we provide for that purpose electromagnets, the cores of certain of which are operated to act as stops, and the magnetization of said magnets is effected through suitable wiring having contact terminal devices attached thereto and a control device for said contacts.

There have been electrical devices heretofore in use provided with magnets, the cores of which are of a magnetic material throughout substantially their length but these devices are uneconomical of material and operation. Further in these devices the contact terminals of the wiring are usually arranged in a circle and the control therefor is in the form of an arm journalled at the center of the circle and the outer end being adapted to be moved about the circle to contact with the terminals. With such devices the control must contact with all intermediate terminals between the initial position of the control and the one desired, forming a current in the corresponding wiring and operating signals other than the one desired. In such devices the wear and tear on the parts and the consumption of current is for the reasons stated objectionably great. A further objectionable feature in devices having the terminal contacts arranged as above stated is that each contact must be labeled so that the driver will know what signal he is operating.

An object of the invention is to improve the construction of the cores of the magnet which operate as stops so that they will be effective in operation and economical of material and current.

Another object is to provide means to operate the signal arm to its several positions by a control and terminals, the arrangement of which is such that the control may be brought into contact with the desired terminals without contacting with any other terminals, in passage from the initial position of the control to the desired terminal; and by which arrangement the control may be correctly brought into contact with the desired terminals without the necessity of observing the position thereof or having an indicating means as a legend or label on said terminal.

Another object is to lock the signal arm in non-signaling position in an effective and positive manner by simple and inexpensive means.

An object of this invention is to provide a signaling device of this character which will conform to all requirements of the present California State laws in this respect, by having a mechanical arm so constructed and arranged that it may be swung through an arc of 135° more or less from start.

An object of the invention is to provide a signaling device of this character which may be applied to such parts of the vehicle as may be desired or considered most convenient, and to operate the same in the simplest and most efficient manner.

With these objects in view we have provided a mechanical arm electrically operated, whose cruising radius is 135° from vertical below center at start, and with stopping points, to-wit: at 45° from vertical, at horizontal or 90° from vertical, and at 45° above such horizontal.

An object of the invention is to provide for automobiles and other vehicles, a semaphore attachment which is operable to the signaling adjustments and to rest by simply positioning a handle in accordance with the position desired for the signal arm so that the position of the handle will indicate to the operator the position given the semaphore.

The invention is adapted to be carried out in various forms and we do not limit ourselves to specific forms of construction. The invention comprises the semaphore and various parts and combination of parts which go to make up the same.

Objects are, simplicity, easy installation, convenient operation and superior effects.

Other objects, advantages and features of invention may appear from the accompanying drawings, the subjoined detail description and the appended claims.

The accompanying drawings illustrate the invention in two of the forms in which it may be embodied, the front and rear appearance of each being practically the same.

Figure 1 is a front or rear view partly in vertical section and partly diagrammatic, illustrating one form of the semaphore attachment and the wiring and switch therefor; the semaphore arm being shown in solid lines as held in "stop" position. Dash and dot, and dash and double dot lines indicate positions for left and right turning, respectively.

Fig. 2 is a reduced fragmental perspective view showing the apparatus mounted on an automobile.

Fig. 3 is a front or rear elevation of the semaphore and its adjustable mounting on small scale and in normal going position.

Fig. 4 is a fragmental view of the case or housing and a part of the adjustable mounting fixed thereto.

Fig. 5 is a sidewise elevation of the appliance viewed from the left of Fig. 1; the housing, and the semaphore arm being shown in vertical mid-section and the operating mechanism being shown mainly intact.

Fig. 6 is a plan section on line $x^6$, Fig. 5.

Fig. 7 is a plan section on line $x^7$, Figs. 1 and 5.

Fig. 8 is a diagram of the electrical circuit with switch in position for operating the arm to stop position in the construction shown in Fig. 1.

Fig. 9 is a typical fragmental elevation in section on line $x^9$, Fig. 1, illustrating the multiple switch in neutral position.

Fig. 10 is a fragmental section on line $x^{10}$, Figs. 1 and 9, showing the switch in stop position.

Fig. 11 is an elevation of another form partly in section on line $x^{11}$, Fig. 13, with the arm in neutral or non-operating position.

Fig. 12 is an elevation of parts in section on line $x^{12}$, Fig. 11.

Fig. 13 is an elevation partly in section on line $x^{13}$, Fig. 11, showing the arm in the second or stop position.

Arrows on the lines of section in the several views indicate the direction of sight.

In the drawings A is the normal going position, B is the "stop" position, C is the left turn, and D the right turn, position of the arm. Referring to the form shown in Figs. 1–8 the frame 1 is shown in the form of a case or housing which may be constructed of sheet metal or any other suitable material, and is adapted to be attached to a vehicle, as the automobile 2. In Figs. 1, 2, 3, 4, 6 and 7 the attaching means is shown as a friction plate 3 having radial corrugations 4 and a hollow stud or stem 5. 6 indicates a complementary friction plate secured to the stud 5 by a thumb nut 7 and provided with an attaching limb 8 which is adapted for attachment to the vehicle by any desired fastening means as bolts s.

The device comprises an elongated frame or housing 1, closed on three sides and open on the fourth side. In the upper end of the housing is pivotally mounted a hollow signaling arm or semaphore 9, adapted to be received within the housing and comprising in like manner to the casing three closed and one open side. The arm, unlike the housing, is provided at both ends of its open side with extensions $9^b$ forming with the walls head members 17, $17^a$ at each end of the arm 9. The open sides of the housing and arm afford access to mechanism in the interior thereof as will later appear. The sides of the housing and arm which face forwardly and rearwardly relative to the vehicle to which the device is attached are provided respectively with apertures 13, 13′ and 14, 14′ at both ends thereof, the apertures at each end of the arm being adapted to coincide with the respective apertures in each end of the housing when the arm is within the housing. Within the heads 17, 17ᵃ of the arm 9 and between the apertures 14 and 14′ respectively are located lamps 16 and 16′ in position so that the direct rays therefrom shine through apertures 13, 14 and 13′, 14′. The apertures 13, 13′ may be provided with bull's eyes on buses 15, 15′ respectively in order to intensify the light at these points, and the apertures 14′ may be provided with bull's eyes 14. Intermediate of the apertures in the arm are elongated slots 9ᵃ through which diffused and reflected light from the lamps 16, 16′ may pass thus preferably illuminating the outline of the stop with light of less intensity than that passing through apertures 13, 14 and 13′, 14′.

By the arrangement of apertures and slots as above described, the position as well as the location of the arm may be discerned by night as well as by day from either the front or rear of the device.

The arm is pivoted to the housing 1 by means of pivots or journals 10, which operate in bearings 10ᵃ formed in cross bars 11, 12 which span the apertures 13 and 14 respectively of the housing and arm, and by this arrangement an effective journaling of the pivots is obtained while a minimum amount of light is obstructed thereby.

The ring is located to one side of the lamp 16 allowing ready access to said lamp and is provided with a projection having an abrupt shoulder on one side and tapering gradually on the other side toward the surface of the ring; the projection forming a catch 18′; cooperating with which are electrically operated stops 19 and 20 arranged to be moved selectively into the path of the catch 18′ to limit the angular movement of the arm 9 beyond certain predetermined signaling positions when raised by the electrical means presently to be described.

These stops are selectively operated by a circuit under the control of a switch 21. Said switch is shown as a three-way switch that is arranged not only to control the stops 19 and 20, but also to control armature 22 of an electro-magnet which latter is shown as a solenoid provided with a coil 23 within which the armature 22 is operable under control of said switch 21. Said armature is operably connected to arm 9 by a connecting rod 24 which is directly pivoted to the armature by pivot 25 and excentrically connected by pivot 25′ to the head of the arm 9 in such manner that when the magnet is not energized, and the arm is at rest under force of gravity, the armature 22 will be fully retracted and will stand in the highest dotted position thereof shown at D in Fig. 1. The arm 9 will be housed when at its lowest position A. When the solenoid 23 is energized, the armature is actuated to swing arm 9 out and up successively through positions B, C, and on to D in Fig. 1; at which positions, respectively, it may be stopped according to the positions of the stops 19 and 20.

The stops 19 and 20 are constructed alike; each having a winding and a core, the upper half of said core being of non-magnetic material, as brass, on which is formed the stop member X and the lower half y being of magnetic material, as iron. Said iron core y is normally located below the magnetic center c of the winding so that when the coil is energized the stop is forced up into stop position. The stops 19 and 20 are at the top and are arranged to be normally drawn down by suitable means, as by gravity, and to be thus held from stop position when the coil is not energized.

In Figs. 9 and 10, a indicates a switch handle pivotally mounted at 28 in switch box 29, and provided with an insulating ball 30 adapted to operate any one of the contacts 31, 32, 33 in any well known manner. By swinging the handle a either to the right or left or toward or from the driver, an appropriate one of the movable contacts 31, 32, 33, may be moved to close one or more circuits.

Said primary contacts 31, 32, 33 are connected to one side of the battery b through ground 34.

In the present embodiment of my invention I have arranged the contact terminals relative to the control or switch handle a so that a movement of the handle either to the right or to the left will close the circuits causing the arm 9 to be raised and stopped in position to indicate the corresponding direction of travel intended, that is, moving the handle to the left will indicate intention of travel to the left. Intention to stop will be indicated by moving the handle forward. When the switch is in neutral position the arm drops by gravity into the housing and receives in the space between the lights 16, 16′ the means that operates the stops 19, 20 and the means that swings the arm on its pivot and also forms a closure for the open side of the housing In Fig. 8 the operation of the switch arm a is indicated by showing three primary contacts 31, 32, 33 as manually operated in the required direction. In the normal directly forward going, or driving position, the circuit will be open at all of the contacts as indicated by the pivoted contacts 32, 33 in solid lines and 31 in broken lines. The switch in Figs. 1, 8, 9 and 10 is indicated as being in stop position; the circuit being closed at contact 31 and open at 32, 33.

The circuits for the several positions of the arm 9 are easily traceable in Fig. 8.

One end of coil 26 is connected by lead 35 to contact 36 adjacent contact 31; one end of coil 27 is connected by lead 37 to contact 38 adjacent to contact 32; and one end of coil 23 is connected by lead 39 with contacts 40, 41 and 42, which are the final switch contacts for the three coils. The main coil 23 is connected by lead 43 with the other side of the battery $b$. The circuits for the lamps 16, 16' of the arm, and the pilot light 44, are connected to opposite sides of battery $b$ by appropriate leads 45 and 46 through the coil 23 as shown so that operation of the arm is always accompanied with illumination of the arm; the pilot light and the lamps 16, 16' glowing only when the arm is in signaling position.

When it is desired to indicate a stop, the handle will be moved into the stop position shown in Fig. 1 and indicated in Fig. 8 by the depressed contact 31. As the contact 31 is operated, connection is made first between the ground 34 and the lead 35 through contact 36; and by a further depression the circuit is closed through contact 40 and lead 39, coil 23, and lead 43 and 47.

The left hand turn position shown by depressing contact 32 in Fig. 8, completes the circuit through lead 37 and contact 38 to energize coil 27 and complete operation of contact 32, closes the circuit through contact 41 and lead 39, coil 23 and leads 43, 47 to battery $b$ to complete the circuit and to energize coils 27 and 23.

For the right hand turn the handle $a$ will be turned as indicated at 33 in Fig. 8, to the dotted position; closing the circuit through contact 42, lead 39, coil 23, lead 43 and return lead 47 to battery $b$.

In each of these complete movements of the switch handle $a$ all the lamps will be lighted and the appropriate coils energized.

In Fig. 1 the first solenoid 26 is shown energized to hold the first stop 19 in position for stopping the arm 9.

The eccentric pivot 25' on the head of the arm 9 is arranged to withdraw the core 22 beyond the magnetic center 48 of the solenoid 23 when the arm 9 is vertical below center 10, and the switch is so arranged that when either of the solenoids 26 or 27 is energized the solenoid 23 will also be energized; and upon such energizing, the solenoid armature seeks the magnetic center until the catch 18 engages the stop, as at 19, which has been brought into stopping position.

It is apparent therefore that when the switch is moved to one position the stop 19 is operated and the arm will be raised and stopped at downwardly aslant position B shown in solid lines in Fig. 1. When the switch is moved to a third position, the first stop remains depressed by gravity and the second stop 20 is drawn up to intercept the catch at the broken line position C.

In the drawings the normal position of the arm is shown at A. When the switch is turned to normal position, the circuit is open and the arm is free to descend by gravity to the position A within the housing. In order to prevent any motion or rattling of the arm in this position a latch 49 is arranged to engage a catch 490 on the arm. Said latch is operable by an armature 50 which is operable within and is responsive to the coil 23, so that when said coil 23 is energized to operate the core 22, the armature 50 and its catch are lifted to release the arm so that it may respond to the operation of the core 22.

The stop position is shown at B. The left turn position is shown at C and the right turn position is shown at D.

In the form shown in Figs. 11, 12 and 13 a different arrangement of parts is shown and the parts corresponding to those in the preceding views are designated like those in said preceding view with the addition of an exponent to the designating characters.

In the form shown in Figs. 11, 12 and 13 the latch 49' engages the catch 490 when the arm 9' is fully depressed; said latch is the core of a solenoid 51, the coil 52 of which is energized by current through leads 53, 54 so that when the current goes through the coil 23' the latch is lifted and the arm 9' is free to be swung through the indicating path by the action of the core 22' which is connected with the circular head 17' by a strap 24', passing over said head, which is in the form of a drum, and being fastened to said head or drum by suitable fastening means as the rivet 24''.

When the solenoid 51 is energized the core 22' revolves the drum and raises the arm. When the current is shut off, the latch 49' drops into place to receive the catch 490.

It is thus seen that we have made provision whereby the indicating arm is moved responsive to the switch handle, and in the same direction, thus to avoid confusion of the driver.

We claim:

1. In a signaling device, a housing adapted to be attached to a vehicle; an arm adapted to be normally mounted in said housing and comprising three closed sides and one open side; said arm having oppositely disposed apertures at both ends; lights adjacent said apertures; cross bars spanning the apertures at one end of the arm; means pivotally connecting said cross bars to said housing; and means adapted to rotate the arm.

2. In a signaling device, a housing adapted to be attached to a vehicle; an arm adapted to be normally mounted in said housing and comprising three closed sides and one open side; said arm having oppositely disposed apertures at both ends and elongated slots between said apertures; lights adjacent said apertures; cross bars spanning the apertures at one end of the arm; means pivotally connecting said cross bars to said housing; and means adapted to rotate the arm.

3. In a signaling device, an elongated hollow housing having an open side and being adapted to be attached to a vehicle; a hollow signaling arm disposed toward the open side of the housing when in raised position and having an open side and being pivoted to one end of said housing and adapted to swing out of said open side in the housing and adapted to be normally held in said housing by latch means comprising a latch pivoted to said housing and a catch formed on said arm; means to swing said arm on its pivot and to release said latch; means to stop said arm in various predetermined angular positions; and means whereby the various angular positions of the arm may be discerned at night, said arm being adapted and arranged so that when it is moved into said housing it forms a closure for the open side of the housing, and the stop means and the means to swing the arm are received in said arm.

In testimony whereof, we have hereunto set our hands at Los Angeles, California, this 6th day of May, 1920.

ERNEST EMERSON BURSON.
LOUIS JACOB MELLER.